United States Patent [19]

Harriman

[11] E Re. 28,824

[45] Reissued May 25, 1976

[54] LASTING APPARATUS WITH YIELDABLE WIPING MEANS

[75] Inventor: Allen C. Harriman, Brockton, Mass.

[73] Assignees: Jacob S. Kamborian, deceased, by Lisbeth N. Godley, executrix, Washington, D.C.; Michael M. Becka and Jacob S. Kamborian, Jr., executors, both of Nashua, N.H.

[22] Filed: Mar. 27, 1975

[21] Appl. No.: 562,744

Related U.S. Patent Documents

Reissue of:

[64] Patent No.: 3,456,273
Issued: July 22, 1969
Appl. No.: 694,942
Filed: Jan. 2, 1968

[52] U.S. Cl. ..... 12/12.5

[51] Int. Cl.[2] ..... A43D 21/00

[58] Field of Search..... 12/12.5, 7, 7.5, 10–10.8, 12/12, 12.4

[56] References Cited

UNITED STATES PATENTS

| | | | |
|---|---|---|---|
| 1,991,417 | 2/1935 | Rohrer | 12/7 |
| 3,126,563 | 3/1964 | Kamborian | 12/12.5 |
| 3,196,470 | 7/1965 | Bowler | 12/12.4 |

*Primary Examiner*—Patrick D. Lawson
*Attorney, Agent, or Firm*—Albert Gordon

[57] ABSTRACT

A heel lasting machine for wiping the heel portion of the margin of an upper mounted on a last against an insole secured to the last bottom by wipers that are yieldably mounted and that are constrained against yieldable movement at the beginning of the wiping operation.

4 Claims, 15 Drawing Figures

INVENTOR
Allen C. Harriman

BY Albert Gordon

5

5

LASTING APPARATUS WITH YIELDABLE WIPING MEANS

Matter enclosed in heavy brackets [ ] appears in the original patent but forms no part of this reissue specification; matter printed in italics indicates the additions made by reissue.

In [ copending application Ser. No. 621,514 filed Mar. 8, 1967 ] *U.S. Pat. No. 3,478,379* there is disclosed an arrangement for supporting a shoe assembly that comprises a shoe upper mounted on a last and an insole located on the last bottom and wiping means for wiping the heel portion of the upper margin against the corresponding portion of the insole. The wiping means are mounted for movement in a plane that is approximately parallel to the insole heel seat and are yieldably mounted for limited universal movement so as to enable the wiping means to yield and conform to the plane of the insole heel seat during a wiping stroke wherein it performs its wiping operation.

During the wiping operation the wiping means engages the upper margin and wipes the upper margin against the insole heel seat by moving under the insole heel seat. It has been found desirable to constrain the wiping means against the limited universal movement during the beginning of the wiping stroke up to the time the wiping means has commenced to wipe the upper margin against the insole and the instant invention is directed to an apparatus for performing this function. While the illustrative embodiment of the invention discloses the invention as being incorporated in a heel wiping arrangement, it obviously can be incorporated in an arrangement for wiping any selected portion of an upper against the corresponding portion of an insole.

Figure 1:
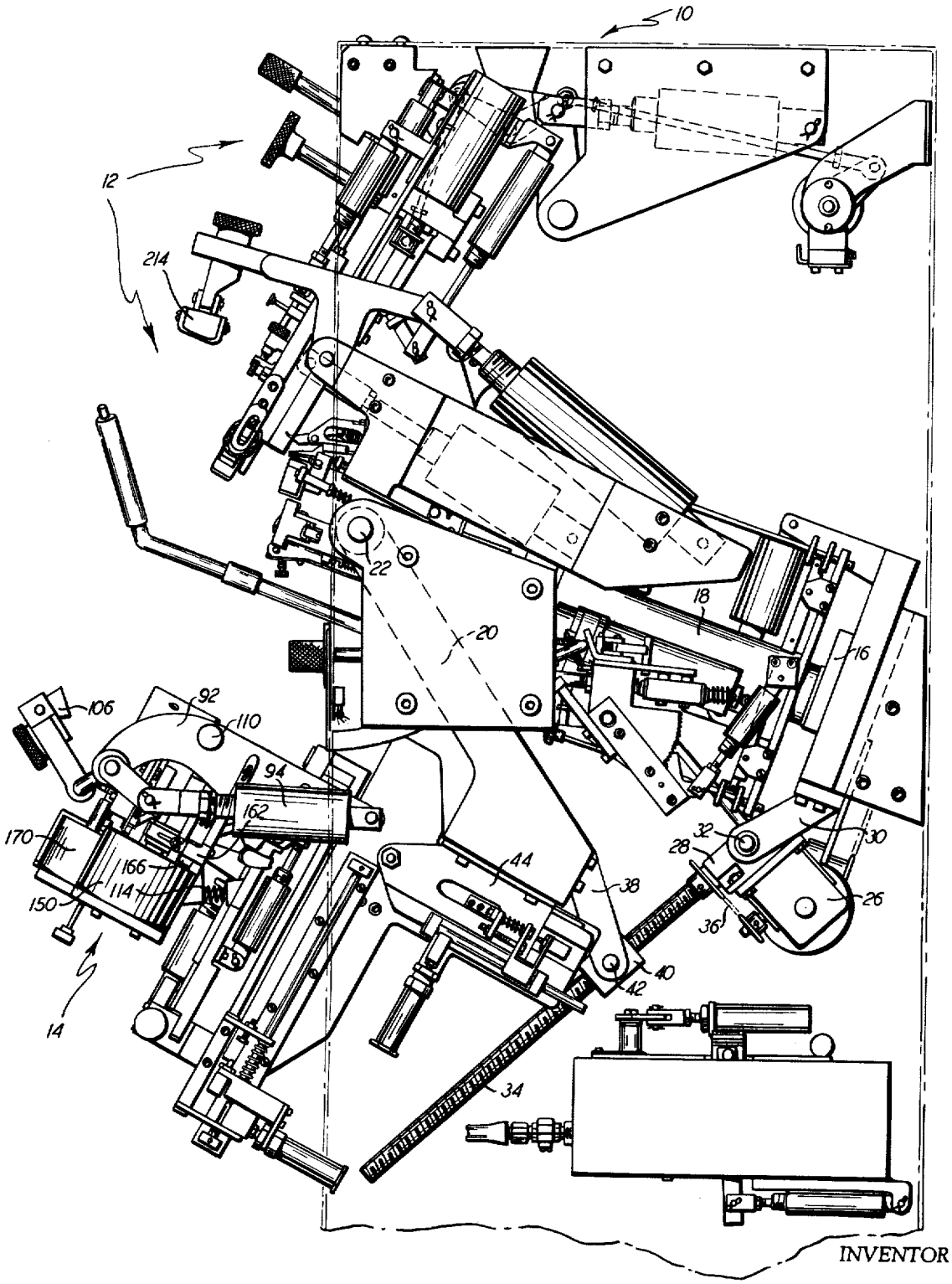
FIG. 1 is a side elevation of a machine incorporating the invention.

As seen in FIG. 1, the machine includes a frame 10 in which are mounted a toe section 12 for pulling the upper on the last and wiping the toe portion of the upper margin against the insole and a heel section 14 for wiping the heel section of the upper margin against the insole. The toe section is constructed similarly to the toe section disclosed in the aforementioned [ application Ser. No. 621,514 ] *U.S. Pat. No. 3,478,379*, but has been modified to incorporate an upper shifting and locking mechanism similar to that disclosed in [ pending application Ser. No. 648,360 filed June 23, 1967 ] *U.S. Pat. No. 3,477,079*.

The frame 10 incorporates a base 16 having a post 18 extending outwardly therefrom at a right angle. For convenience of operation, the machine is inclined downwardly in a direction extending from the toe section 14. However, parts extending in the direction of the longitudinal axis of the post 18 will be referred to as extending vertically and parts extending in a direction at right angles to the longitudinal axis of the post 18 will be referred to as extending horizontally. The operator is intended to be located to the left of the machine as seen in FIG. 1, and a direction extending toward the operator (right to left in FIG. 1) will be referred to as "forward" while a direction extending away from the operator (left to right in FIG. 1) will be referred to as "rearward".

Figure 2:
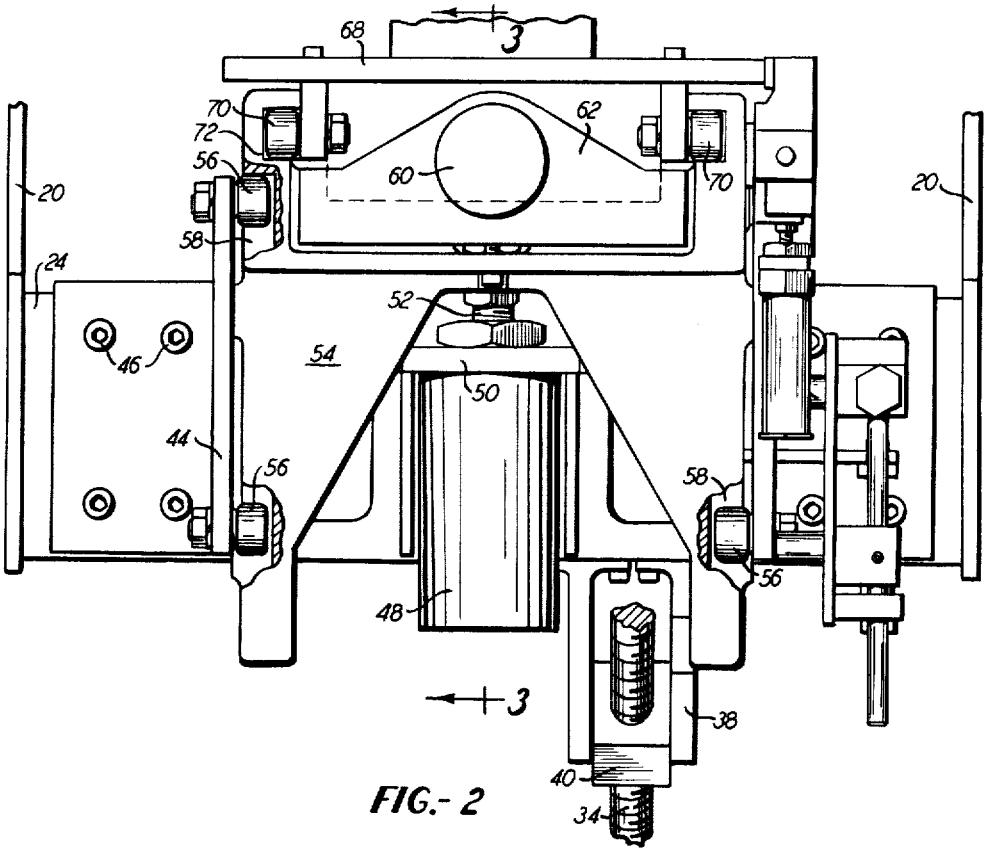
FIG. 2 is an elevation of a heel head and a heel slide that form a part of a heel section of the machine.
Figure 3:
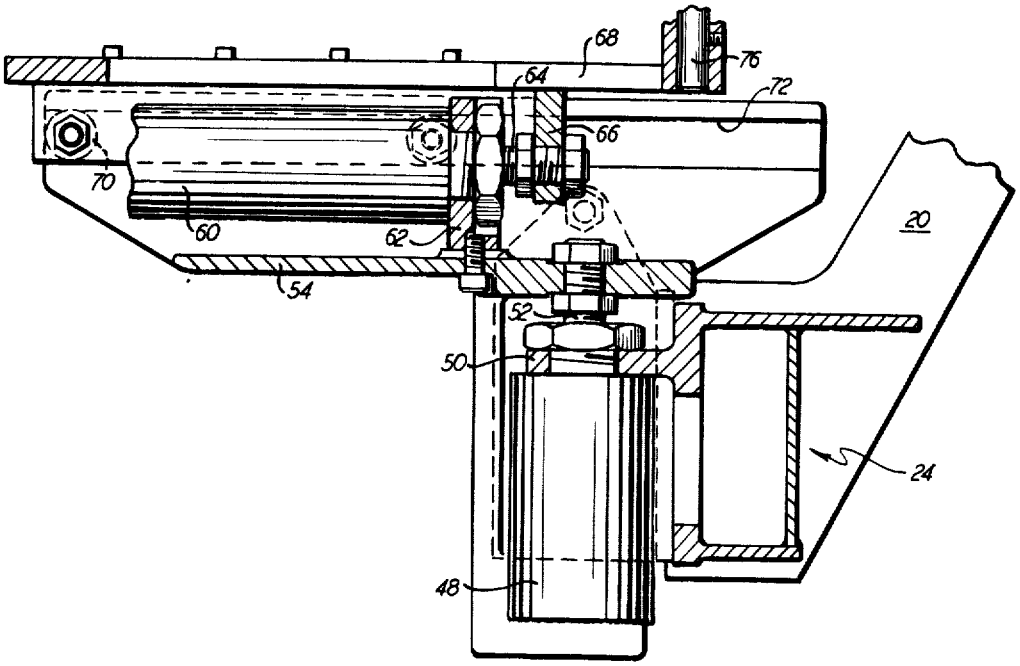
FIG. 3 is a section taken on the line 3—3 of FIG. 2.

Referring to FIGS. 1–3, the heel section 14 comprises a pair of arms 20, each of which is pivoted to a side of the frame 10 on a pivot pin 22 to extend downwardly and forwardly thereof. A brace 24 is secured to and straddles the bottoms of the arms 20. A reversible electric motor 26 is mounted on a bracket 28. The bracket 28 is pivotally connected to a lug 30 that is secured to the frame 10 by a pivot pin 32. A threaded bolt 34 is rotatably mounted in the bracket 30 and extends forwardly thereof. A chain 36 connects the motor 26 and the bolt 34 to thereby effect rotation of the bolt in response to the operation of the motor. A hanger 38, that is bolted to the brace 24, has a nut 40 pivoted thereto by a pivot pin 42. The nut 40 is threaded onto the bolt 34.

A heel mount 44 is connected to the brace 24 by bolts 46. An air actuated motor 48, secured to a flange 50 on the brace 24, has an upwardly extending piston rod 52 that is secured to a heel head 54. Rolls 56, secured to the heel mount 44, are received in tracks 58 in the heel head 54 to thereby guide the heel head for heightwise movement in response to the actuation of the motor 48.

An air actuated motor 60, secured to a rib 62 of the heel head 54, has a rearwardly extending piston rod 64 that is secured to a hanger 66 of a heel slide plate 68. Rolls 70, secured to the heel slide plate 68, are received in tracks 72 in the heel head 54 to thereby guide the heel slide 68 for forward-rearward movement in response to actuation of the motor 60.

Figure 5:
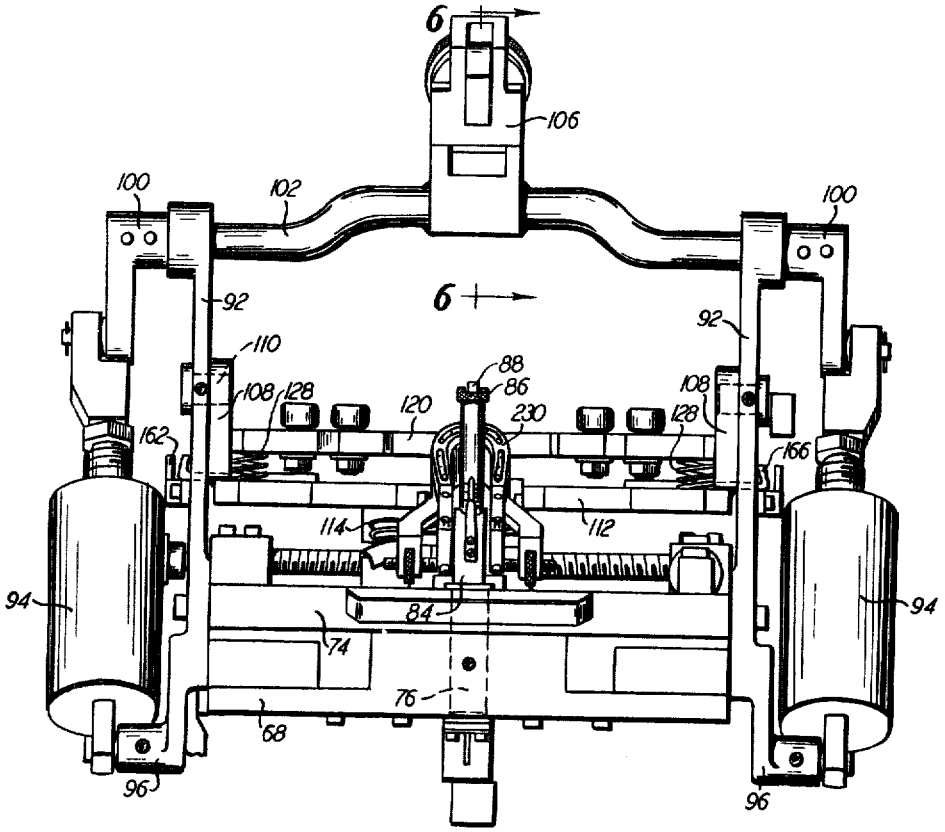
FIG. 5 is a view taken on the line 5—5 of FIG. 4.
Figure 4:
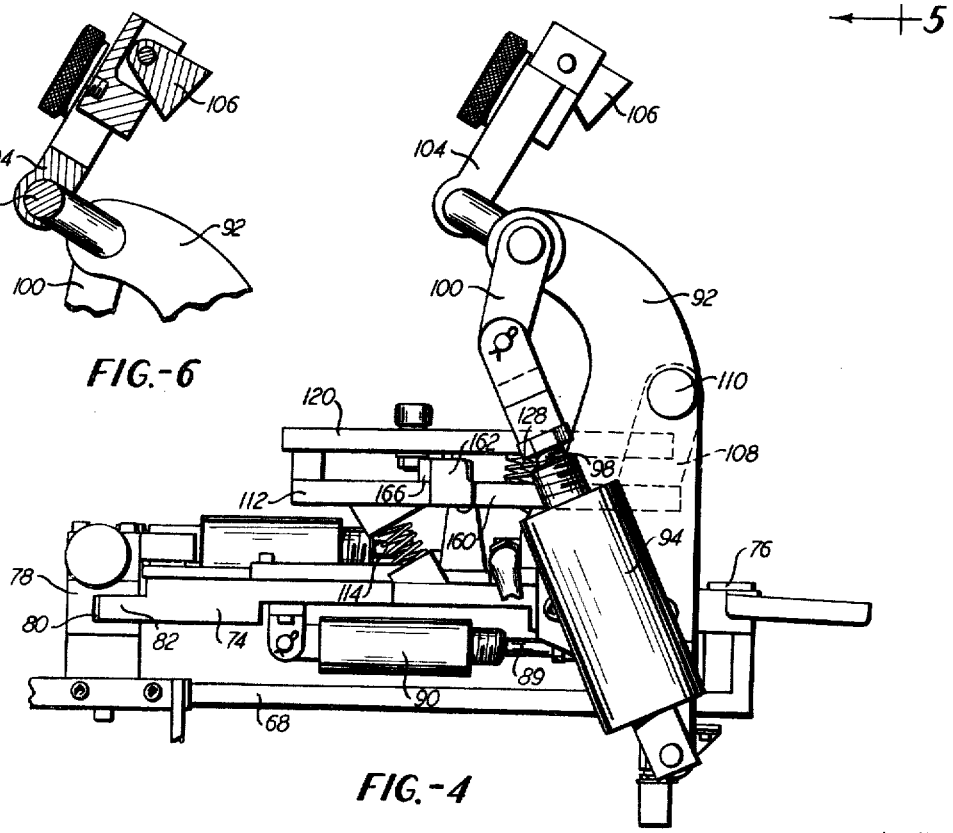
FIG. 4 is a side elevation of the heel slide, an adjustment plate, a back-up support plate, a back-up plate and a heel holddown that form a part of the machine heel section.
Figure 7:
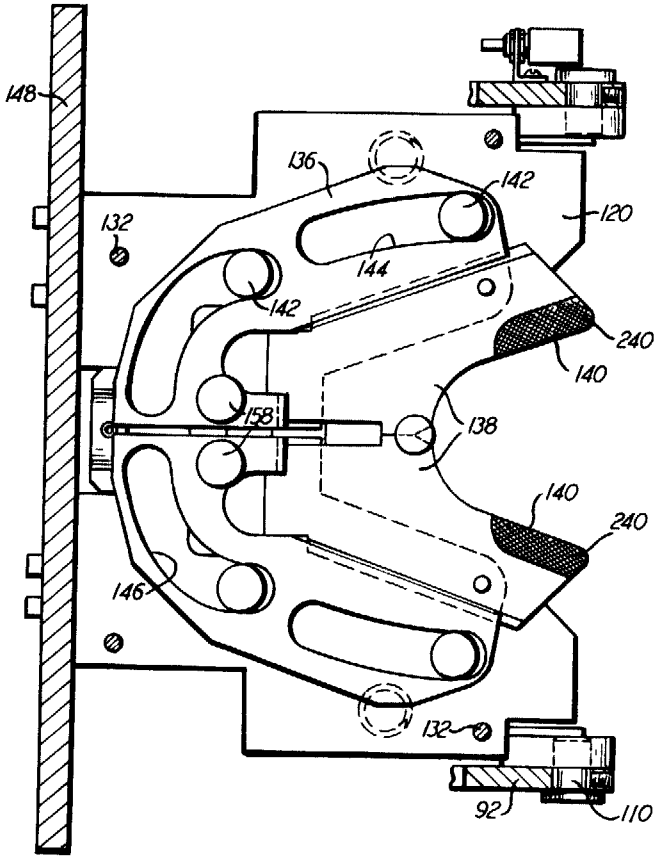
FIG. 7 is a plan view of the heel wiping means.
Figure 8:
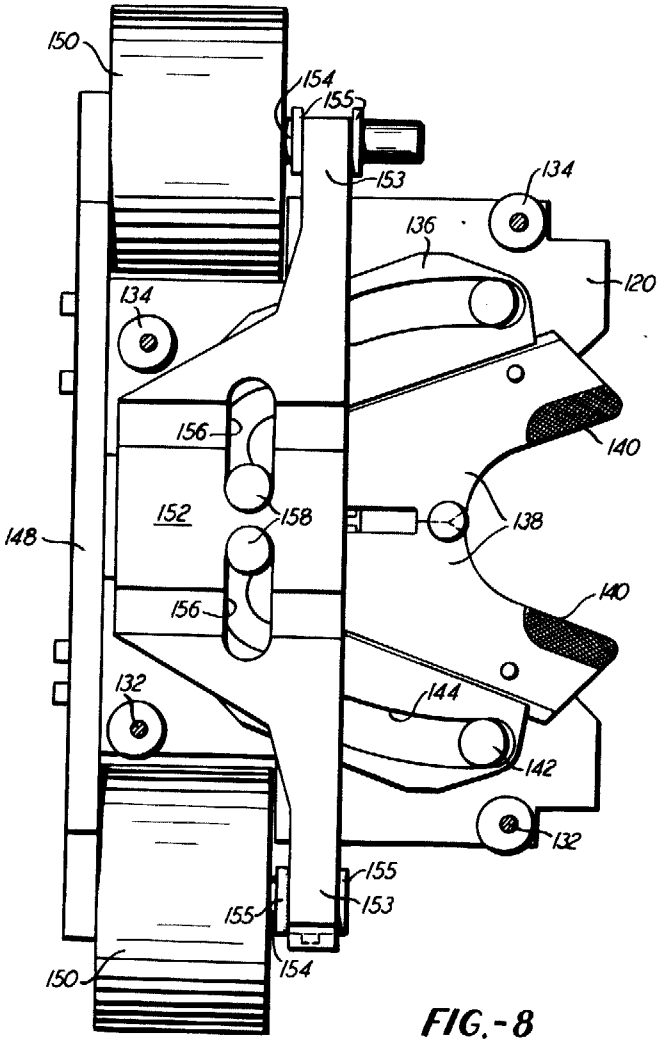
FIG. 8 is a plan view of the heel wiping means together with its drive means.

Referring to FIGS. 4 and 5, an adjustment plate 74 is pivotally mounted for swinging movement on a pin 76 that extends upwardly from the back of the heel slide 68. A rib 78, that is secured to and extends upwardly of the front of the heel slide 68, has a groove 80 that slidably receives a tail 82 of the adjustment plate 74. Means, disclosed in greater detail in the aforementioned [ application Ser. No. 621,514 ] *U.S. Pat. No. 3,478,379*, are provided to position the adjustment plate 74 in a selected position about the axis of the pin 76.

Referring to FIG. 5, a heel rest housing 84, having a heel rest 86 secured thereto, is slidably mounted for heightwise movement at the rear of the adjustment plate 74. A height sensing pin 88 is slidably mounted to the heel rest 86 and is yieldably urged upwardly thereof. The piston rod 89 of an air operated motor 90 (FIG. 4), that is pivoted to the adjustment plate 74, is operatively connected to the heel rest to effect heightwise movement thereof. Reference is made to the aforementioned [ application Ser. No. 621,514 ] *U.S. Pat. No. 3,478,379*, for a more detailed disclosure of these parts.

Figure 6:
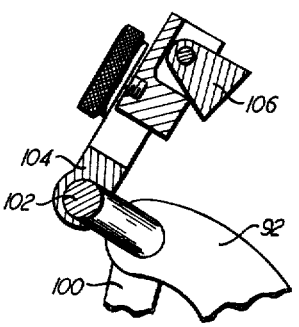
FIG. 6 is a view taken on the line 6—6 of FIG. 5.

Referring to FIGS. 4–6, an upright 92 is bolted to the back of each side of the adjustment plate 74. An air actuated motor 94 is pivoted to a lug 96 that extends outwardly of each upright 92. The upwardly extending piston rod 98 of each motor 94 is pivoted to a link 100. Each link 100 is pinned to an end of a rod 102 that is rotatably mounted in the tops of the uprights 92. A hold-down mount 104 is rigidly connected to the mid-portion of the rod 102 and a heel hold-down 106 is pivotally mounted to the mount 104.

The slide plate 68, adjustment plate 74 and uprights 92 comprise a primary arrangement.

Referring to FIGS. 4, 5, 9 and 10, a hanger 108 is pivoted to each upright 92 by a pin 110. A back-up support plate 112 is welded to and extends forwardly between the bottoms of the hangers 108. A spring 114, interposed between the adjustment plate 74 and the support plate 112, acts to yieldably urge the support plate upwardly about the transverse axes of the pins 110. A pair of spaced trunnions 116 and 118 extend upwardly of the support plate 112. A back-up plate 120, located spacedly above the support plate 112, has a downwardly extending trunnion 122 that is situated between the trunnions 116 and 118. A forwardly-rearwardly extending bar 124 is secured in holes in the trunnions 116, 118 by set screws 126 and extends through a hole in the trunnion 122 thus mounting the back-up plate 120 for swinging movement about the axis of the bar 124. A spring 128 is located on each side of the bar 124 and each spring is interposed between the support plate 112 and the back-up plate 120.

Referring to FIGS. 7–9, 11 and 12, a cover plate 130 is located spacedly above and is bolted to the back-up plate 120 by means that include bolts 132 and spacers 134. A pair of symmetrically disposed heel wiper cams 136 are slidably mounted between the back-up plate 120 and the cover plate 130. Heel wipers 138, having rearwardly, divergent surfaces 140, are attached to the cams 136. Pins 142, secured to and extending upwardly of the back-up plate 120, extend into slots or cam tracks 144 and 146 formed in the wiper cams 136. A rib 148 is secured to the front of the cover plate 130 and an air actuated motor 150 is secured to each end of the rib. A bridge 152 is secured at each of its ends 153 between a pair of flanges 155 on each of the rear ends of the rearwardly extending piston rods 154 of the motors 150. A pair of transverse slots 156 are formed in the bridge 152, and each of these slots receives a pin 158 that extends upwardly of a wiper cam 136.

Figure 9:
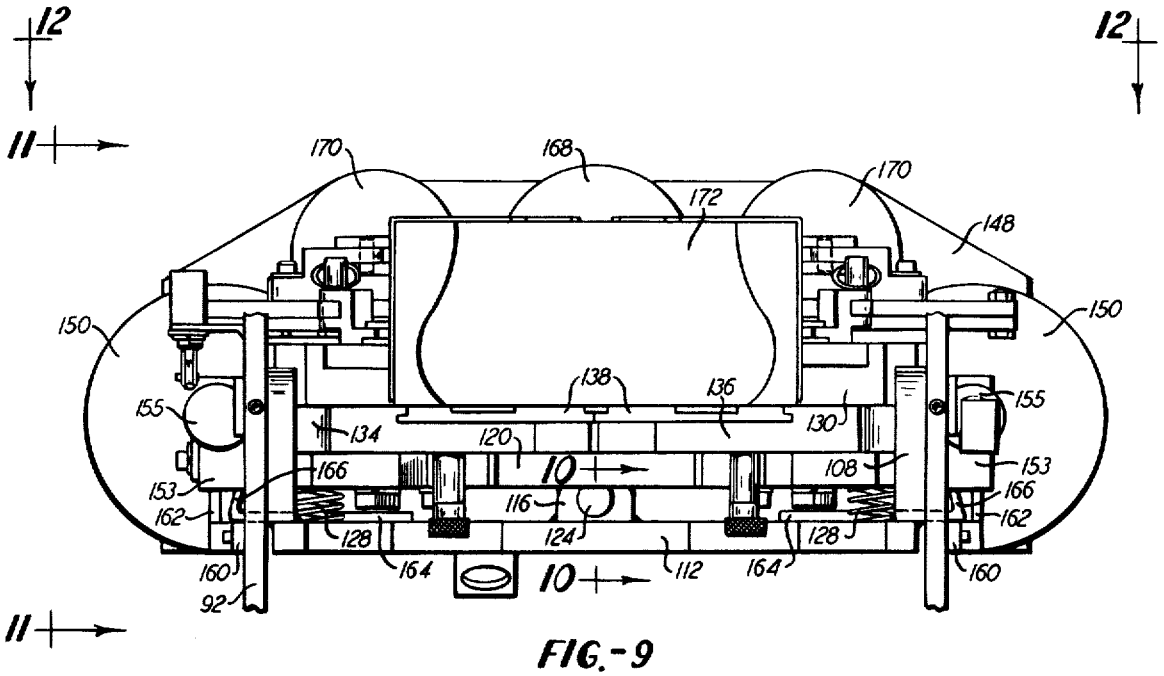
FIG. 9 is an elevation showing the heel wiping means and a heel clamp pad.
Figure 10:
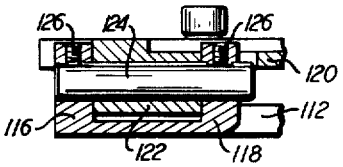
FIG. 10 is a section taken on the line 10—10 of FIG. 9.
Figure 11:
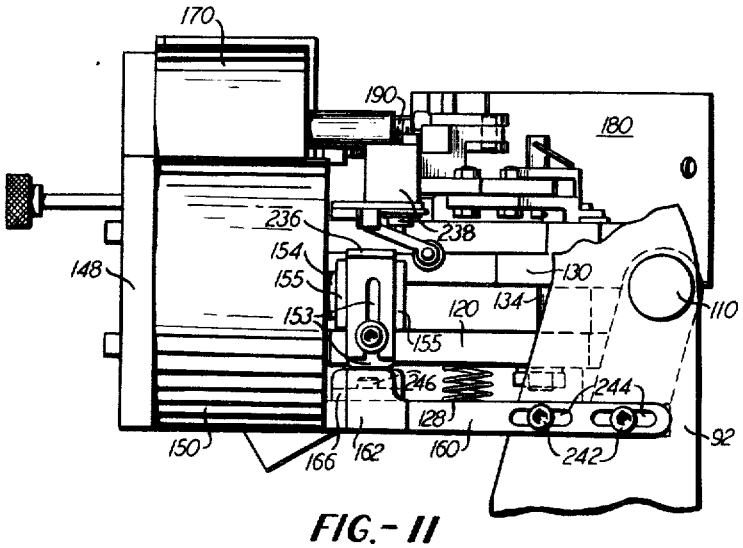
FIG. 11 is a view taken on the line 11—11 of FIG. 9.

As shown in FIGS. 9 and 11, a forwardly extending strap 160 is bolted to the exterior of each upright 92. The front of each strap 160 is formed into an upwardly extending lug 162. A strap 164 is bolted to each side of the support plate 112, and the outer end of each strap 164 has an upwardly extending lug 166 that is located inwardly of a lug 162. Each pair of lugs 162, 166 normally bears against the bottom of a bridge end 153.

Figure 12:
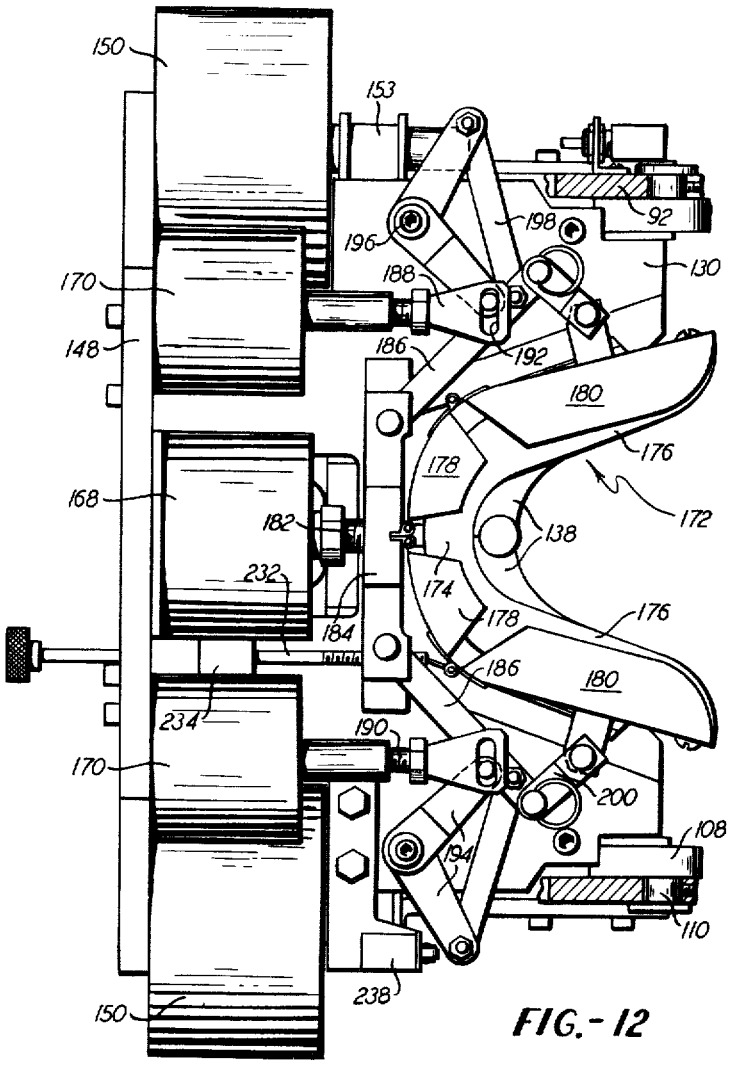
FIG. 12 is a view taken on the line 12—12 of FIG. 9.

Referring to FIGS. 11 and 12, an air actuated pad bight motor 168 is secured to the rib 148 and an air actuated pad leg motors 170 is secured to the rib 148 on each side of the motor 168. A heel clamp pad 172, formed from a yieldable material such as rubber, is located rearwardly of the motor 168. The pad 172 is a substantially U-shaped member having a bight 174 and a pair of legs 176 extending rearwardly from the bight. A pair of band sections 178 and 180 are located exteriorly of each side of the pad 172 and are hinged to each other as shown in FIG. 12. The band sections 178, 180 have flanges that overlie the pad 172 and the pad rests on the heel wipers 138, thereby restraining the pad against heightwise movement. The pad 172 has a hollow interior 181 (FIG. 13) which is connected by means, not shown, to a source of compressed air. The rearwardly extending piston rod 182 of the motor 168 is secured to a strap 184 that extends laterally of the piston rod 182 towards the motors 170. A rearwardly and outwardly extending link 186 is pivoted to each end of the strap 184. A lug 188, secured to the rear of the piston rod 190 of each motor 170, has a transverse slot 192 that receives the inner end of a two armed lever 194. Each lever 194 is pivoted at its midsection 196 to the cover plate 130. The outer end of each lever 194 is pivoted to the outer end of a link 198, and each link 198 is pivoted to its associated link 186 near its rear end. A link 200 is pivoted to the rear of each link 186. Connections, not shown in detail, are provided to connect the rear of the piston rod 182 to the pad bight 174 and the rears of the links 200 to the pad legs 176.

In the idle condition of the machine: the piston rod 52 is retracted into the motor 48 to maintain the heel head and the parts carried thereby in a lowered position; the piston rod 64 is retracted into the motor 60 so that the heel slide 68 and the parts carried thereby are in a forward position; the piston rod 89 is projected out of the motor 90 so that the heel rest 86 and the height sensing pin 88 are in an upper position with respect to the adjustment plate 74; the piston rods 98 are retracted into the motors 94 to maintain the heel hold-down 106 in a raised position; the piston rods 154 are retracted into the motors 150 to maintain the heel wipers 138 in a retracted position with the lugs 162, 166 bearing against the bottoms of the bridge ends 153; the piston rod 182 is projected out of the motor 168 under relatively light pressure to maintain the bight 174 of the heel clamp pad 172 in a rearward position; the piston rods 190 are projected out of the motors 170 so that the legs 176 of the heel clamp pad 172 are in their most open position; and there is no pressurized air entering the pad 172 so that the pad is in a deflated condition.

Figure 13A:
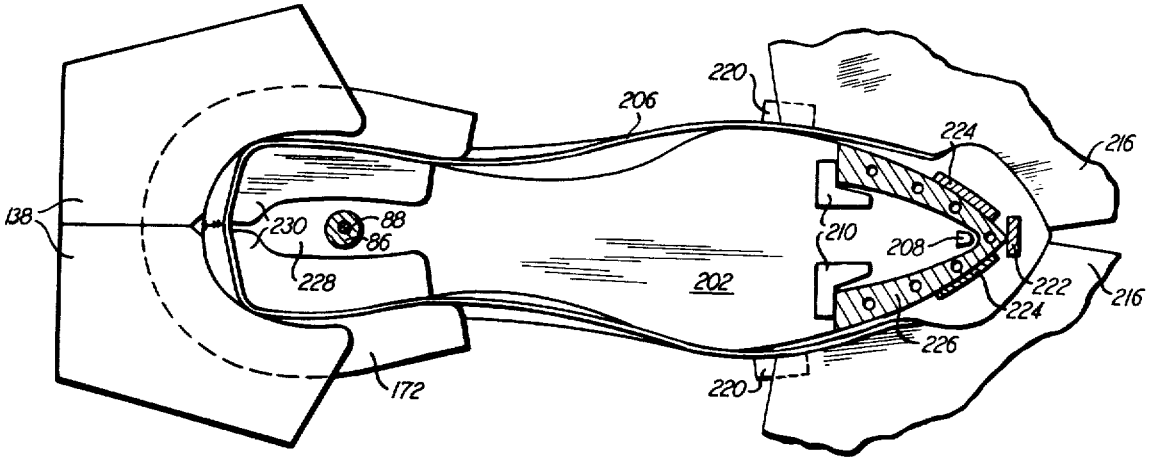
FIG. 13A is a view taken on the line 13A—13A of FIG. 13.
Figure 13:
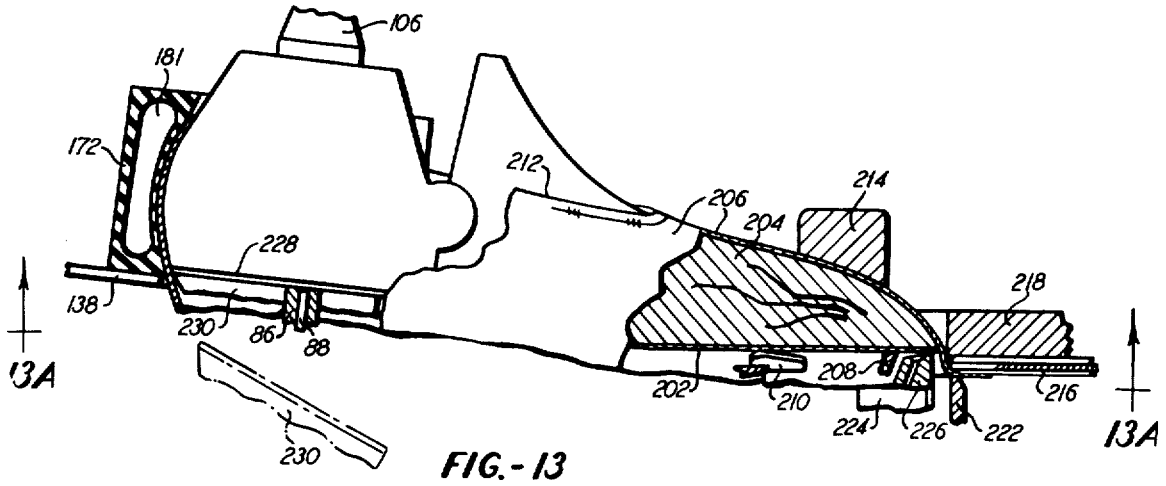
FIG. 13 is a representation of the shoe assembly in the machine immediately before the heel wiping operation.

Referring to FIGS. 13 and 13A, at the beginning of a machine cycle a shoe assembly is presented bottom-down to the machine. The shoe assembly comprises a shoe insole 202 located on the bottom of a last 204, as by being tacked thereto, and a shoe upper 206 draped loosely over the last. The insole is brought to bear against the tops of a toe rest 208 and a pair of forepart rests 210 located in the machine toe section 12. By means disclosed in the aforesaid [ application Ser. No. 621,514 ] *U.S. Pat. No. 3,478,379*, the upper is pulled and stretched about the toe end of the last (which is at the right end of the last in FIGS. 13 and 13A) and also in a heel to toe direction (left to right direction in FIGS. 13 and 13A) to provide for a tight stretching of the upper about the toe and forepart of the last with the topline 212 (FIG. 13) of the upper stretched tightly on the last.

After this, the machine cycle causes the shoe engaging parts to arrive in the position shown in FIGS. 13 and 13A. In this position, a toe hold-down 214 bears against the forepart of the shoe assembly, toe wipers 216 are located rearwardly of and adjacent the toe end of the shoe assembly with the tops of the toe wipers spaced below the forepart portion of the insole 202 by an amount that is approximately equal to the thickness of the margin of the upper 206, a yoke 218 and bumpers 220 are caused to clamp the toe and forepart portion of the upper against the last, the toe and forepart portions of the upper margin are pressed against the bottoms of the toe wipers 216 by a front retarder 222 and side retarders 224, a toe cement applicator 226 bears against the margin of the toe portion of the insole, the heel hold-down 106 bears against the top of the last 204, the heel rest 86 and the height sensing pin 88 bear against the heel seat portion 228 of the insole 202, the heel wipers 138 are located forwardly of and adjacent to the heel portion of the shoe assembly with the tops of the heel wipers preferably being spaced below the insole heel seat portion 228 an amount that corresponds to the thickness of the margin of the heel portion of the upper 206, the heel clamp pad 172 is inflated and pressing the heel portion of the upper 206 against the last 204, a heel cement applicator 230 has been raised from the position shown in phantom in FIG. 13 to the position shown in solid wherein it bears against the margin of the insole heel seat portion 228 and cement has been extruded from the applicators 226 and 230 against the margins of the toe and heel seat portions of the insole.

When the shoe assembly is placed on the toe rest 208 and the forepart rests 210 at the beginning of the machine cycle, the forepart portion of the insole 202 will lie in the predetermined plane of the rests 208, 210 and the heel seat 228 of the insole will lie in a plane that extends upwardly and forwardly from the plane of the forepart portion of the insole as indicated in FIG. 13, the plane of the insole heel seat 228 being dependent on the style of the particular shoe assembly being worked on. Before placing the shoe assembly in the machine and starting the machine cycle, the motor 26 (FIG. 1) is caused to swing the arms 20 together with the heel section 14 about the axes of the pins 22 to bring the heel wipers 138 into a plane that is approximately parallel to the plane of the insole heel seat 228.

As shown in FIG. 13A, when the shoe assembly is placed on the rests 208 and 210 at the beginning of the machine cycle, the heel portion of the shoe assembly will extend to one side or the other of the center line of the toe portion of the shoe assembly. The angle that the center line of the heel portion of the shoe assembly makes with the toe portion of the shoe assembly is dependent on the size and style of the shoe assembly. The side of the center line of the toe portion of the shoe assembly in which the heel portion of the shoe assembly lies depends on whether a left or right foot shoe is being operated on. Prior to placing the shoe assembly to be operated on in the machine, the adjustment plate 74 is swung about the axis of the pin 76 by means shown in the aforementioned [ application Ser. No. 621,514 ] *U.S. Pat. No. 3,478,379* to a position wherein the heel wipers 138 and the heel clamp pad 172 are symmetrically disposed with respect to the heel portion of the shoe assembly.

In order to bring the heel section parts 86, 88, 106, 138 and 172 from their idle positions to the position shown in FIGS. 13 and 13A, the motor 60 is actuated to move its piston rod 64 rearwardly to thereby move the heel slide 68, the heel rest 86, the heel hold-down 106, the heel wipers 138 and the heel clamp pad 172 rearwardly in a plane that is approximately parallel to the plane of the heel seat portion 228 of the insole of the shoe assembly being operated on. This rearward movement continues until the bight 174 of the pad 172 engages the heel of the shoe assembly which causes the pad bight to move forwardly against the force of the low pressure air in the motor 168 to thereby move the piston rod 182 together with the strap 184 and a bar 232 (FIG. 12) attached to the strap forwardly until a valve actuator (not shown) on the bar actuates a valve 234 (FIG. 12). The actuation of the valve 234 causes the piston rod 64 of the motor 60 to be locked against further movement and actuates the motor 168 to move its piston rod 182 forwardly to thereby move the pad bight 174 forwardly out of engagement with the heel portion of the shoe assembly. During this forward movement of the pad bight 174, the pad legs 176 remain substantially in their initial outer position. During the rearward movement of the heel slide 68, the heel rest 86 and the height sensing pin 88 move beneath the heel seat portion 228 of the insole. After this the motor 48 is actuated to raise the heel head 54, the heel rest 86, the heel hold-down 106, the heel wipers 138 and the heel clamp pad 172 in a plane that is approximately at right angles to the plane of the heel seat portion 220 of the insole until the heel rest 86 and the height sensing pin 88 engage the insole heel seat 228. During this heightwise movement the pad bight 174 does not bear against the heel portion of the shoe assembly due to its having been moved forwardly after it had engaged the heel portion of the shoe assembly during its rearward movement. In response to the engagement of the height sensing pin 88 with the insole heel seat 228, the piston rod 52 of the motor 48 is locked against further upward movement. At this time the heel portion of the shoe assembly is supported by the heel rest 86. After this the heel cement applicator 230 is raised to the solid line position of FIG. 13, the motors 170 and 168 are actuated to move the piston rods 190 forwardly and the piston rod 182 rearwardly to thereby cause the heel clamp pad 172 to move against the heel portion of the upper and press it tightly against the last, and pressurized air is admitted into the hollow interior 181 of the heel clamp pad 172 to cause the inner peripheral wall of the pad to expand inwardly against the shoe assembly and thus augment the holding and clamping action of the upper against the last by the pad 172. At about the same time that the heel clamp pad 172 is forced against the shoe assembly, the motors 94 are actuated to force the heel hold-down 106 against the top of the last.

Figure 14:
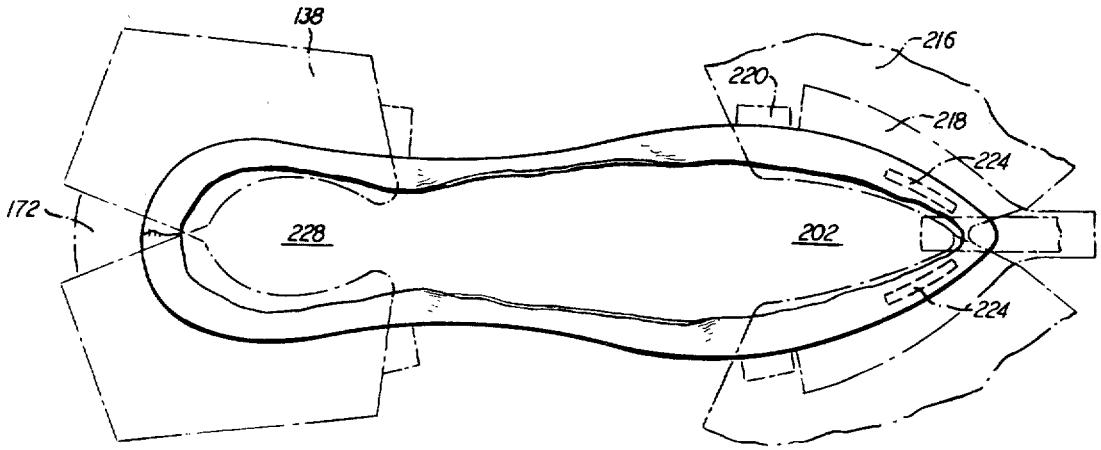
FIG. 14 is a representation of the shoe assembly in the machine at the completion of the wiping operation.

After the machine parts have arrived at the FIGS. 13 and 13A position, the heel wipers 138 and the toe wipers 216 are respectively caused to move through a heel wiping stroke and a toe wiping stroke after which the machine parts assume the position shown in FIG. 14.

The heel wiping stroke is caused by the actuation of the motors 150 to move their piston rods 154 rearwardly. This causes the bridge 152 to move rearwardly to thereby cause the pins 158 to move rearwardly. The rearward movement of the pins 158 causes the heel wipers 138 to move rearwardly and inwardly in its heel wiping stroke with the wiper surfaces 140 approaching each other during this stroke to intersect the upper margin, move under the insole and wipe the upper margin against the insole heel seat portion 228. This causes the wiped upper margin to be attached to the insole heel seat through the cement that had been applied to the insole heel seat by the applicator 230. The configuration of the cam tracks 144 and 146 determines the specific path of rearward and inward movement of the heel wipers during their heel wiping stroke, and the pins 158 move outwardly in the slots 156 during the heel wiping stroke to permit the inward movement of the wiper surfaces 140. During the heel wiping stroke the heel cement applicator 230 is lowered back to the phantom position of FIG. 13 out of the path of the oncoming heel wipers 138.

As shown in FIG. 11, one of the bridge ends 153 carries a cam 236 and the cover plate 130 carries a valve 238. The cam 236 and the valve 238 are in alignment so that the valve 238 is opened by the cam 236 during the heel wiping stroke of the heel wipers 138. The opening of the valve 238 actuates the motor 90 to lower the heel rest 86 and the height sensing pin 88 out of the path of the oncoming heel wipers 138. At the end of the heel wiping stroke, the motors 94 are caused to force the heel hold-down 106 downwardly under greater pressure than had heretofore been applied by the heel hold-down. This causes the heel portion of the shoe assembly to be forced against the heel wipers 138 under bedding pressure to thereby iron the wiped heel portion of the upper margin against the heel seat portion 228 of the insole.

Since the lugs 162 bear against the cam surfaces formed by the bottoms of the bridge ends 153 at the beginning of the heel wiping stroke, the extent is limited to which the weight of the parts carried by the back-up plate can swing this plate counter-clockwise (FIG. 4) about the transverse axes of the pins 110. Since the lugs 166 bear against the cam surfaces formed by the bridge ends 153 at the beginning of the heel wiping stroke, the springs 128 are ineffectual on the back-up plate 120 to swing the back-up plate about the longitudinal axis of the bar 124. Therefore, at the beginning of the heel wiping stroke, the heel wipers 138 which are carried by the back-up plate are constrained to move in a plane parallel to that of the back-up plate. After the heel wipers have crossed under the last and commenced to wipe the upper margin against the insole, the cam surfaces formed by the bridge ends 153 move rearwardly out of engagement with the lugs 162 and 166. This disengagement of the lugs 162 from the bridge ends 153 enables the heel wipers to swing about the transverse axes of the pins 110 and the disengagement of the lugs 166 from the bridge ends 153 enables the heel wipers to swing about the longitudinal axis of the bar 124. This enables the back-up plate 120 to be yieldably urged upwardly by the springs 114 and 128 to be capable of having limited universal movement about the transverse axes of the pins 110 and the longitudinal axis of the bar 124. Therefore, if the heel wipers 138 do not move in a plane that is parallel to the plane formed by the bottom of the heel seat portion 228 of the insole, the heel wipers, which are slidably mounted on the back-up plate 120, will shift against the forces of the springs 114 and 128 until they assume a position in a plane parallel to the plane of the insole heel seat.

During the early portion of the heel wiping stroke when the heel wipers are commencing to wipe the upper margin against the insole, it is desirable that the heel wipers move unyieldingly in the plane parallel to that of the back-up plate so that the stresses during the initial engagement of the wipers with the upper margin and the initial wiping of the upper margin against the insole will not cause any portion of the wiper surfaces 140 to deflect downwardly away from the insole and thereby create a slackness or looseness in that portion of the upper margin that is folded or wiped about the corner formed by the intersection of the insole heel seat and the sides of the heel portion of the last. It is for this reason that the heel wipers are constrained for planar movement at the beginning of the heel wiping stroke.

As shown in FIG. 11, the lugs 162 are mounted to the uprights 92 for forward-rearward adjustment by means of bolts 242 and slots 244. The lugs 166 are similarly mounted to the support plate 112 for forward-rearward adjustment by bolts 246 (FIG. 11) and slots (not shown). By means of these adjustments the time in the heel wiping stroke in which the heel wipers 138 are released for movement about the transverse axis of the pins 110 and for movement about the longitudinal axis of the bar 124 may be adjusted.

During the toe wiping stroke, the toe wipers 216 are caused to move forwardly and inwardly to engage to toe and forepart portions of the upper margin, wipe the upper margin against the insole and bond the wiped margin to the insole by means of the cement that had been applied to the insole margin by the toe cement applicator 226. During the toe wiping stroke, the toe cement applicator 226 and the rests 208 and 210 are lowered out of the path of the oncoming toe wipers and the upwardly directed force applied by the front retarder 222 against the bottoms of the toe wipers is relieved. At or near the end of the toe wiping stroke, bedding pressure is applied by the toe hold-down 214 against the toe and forepart portion of the shoe assembly while this portion of the shoe assembly is supported by the toe wipers 216.

After the lapse of a predetermined time interval, the machine parts are returned to their idle condition which releases the toe lasted and heel seat lasted shoe assembly from the machine.

I claim:

1. A lasting apparatus comprising: a support arrangement for supporting bottom-down a shoe assembly, that comprises a last having an insole located on its bottom and an upper mounted thereon, with a selected portion of the upper margin extending downwardly of the corresponding portion of the insole in such a manner that said portion of the insole substantially lies in a particular plane; a primary arrangement; a back-up plate located above the primary engagement; yieldable means mounting the back-up plate to the primary arrangement so as to provide for limited universal movement of the back-up plate with respect to the primary engagement; [ wiping means ] *a pair of wipers*; means mounting the [ wiping means ] *wipers* to the back-up plate for planar *and inward* movement with respect to the back-up plate between a retracted and an advanced position; means for initially maintaining the [ wiping means ] *wipers* in [ its ] *their* retracted position in a wiping position that is adjacent to said portion of the shoe assembly, that is in registry with said portion of the insole and that is maintained in a plane that is approximately parallel to said particular plane; means for thereafter moving the [ wiping means ] *wipers rearwardly and inwardly* from [ its ] *their* retracted to [ its ] *their* advanced position through a wiping stroke to wipe said upper margin portion against said insole portion, said yieldable means mounting the back-up plate to the primary engagement enabling the [ wiping means ] *wipers* during the wiping stroke to partake of said limited universal movement so as to conform precisely to the plane of said portion of the insole; and means effective only at the beginning of the wiping stroke to constrain the [ wiping means ] *wipers* against said limited universal movement provided by the yieldable means, whereby the yieldable means is operative on the [ wiping means ] *wipers* only after the [ wiping means has ] *wipers have* commenced to wipe said upper margin portion against said insole portion.

2. The apparatus as defined in claim 1 wherein the means for moving the [ wiping means ] *wipers* comprises: drive means operatively connected to the [ wiping means ] *wipers* for effecting said movement of the [ wiping means ] *wipers*; wherein the apparatus further comprises: a cam, operatively connected to said drive means and said [ wiping means ] *wipers*, so constructed and arranged as to move from a retracted position to an advanced position during said wiping stroke in a plane corresponding to the plane of movement of the [ wiping means ] *wipers*; and wherein said means to constrain the [ wiping means ] *wipers* against said limited universal movement comprises: lug means mounted to said primary arrangement so constructed and arranged as to bear against the cam only at the beginning of the wiping stroke.

3. A lasting apparatus comprising: a support arrangement for supporting bottom-down a shoe assembly that comprises a last having an insole located on its bottom and an upper mounted thereon with a selected portion of the upper margin extending downwardly of the corresponding portion of the insole in such a manner that said portion of the insole substantially lies in a particular plane; a primary arrangement; a support plate mounted to the primary arrangement for swinging movement about a transverse axis; first spring means yieldably urging the support plate upwardly about said transverse axis; a back-up plate located above the support plate and mounted to the support plate for swinging movement about a longitudinal axis; second spring means interposed between the support plate and the back-up plate for yieldably urging the back-up plate about said longitudinal axis; said first and second spring means providing for limited universal movement of the back-up plate with respect to the primary arrangement; [ wiping means ] *a pair of wipers*; means mounting the [ wiping means ] *wipers* to the back-up plate for planar *and inward* movement with respect to the back-up plate between a retracted position and an advanced position; means for initially maintaining the [ wiping means ] *wipers* in [ its ] *their* retracted position in a wiping position that is adjaent to said portion of the shoe assembly, that is in registry with said portion of the insole and that is maintained in a plane that is approximately parallel to said particular plane; means for thereafter moving the [ wiping means ] *rearwardly and inwardly* from [ its ] *their* retracted to [ its ] *their* advanced position through a wiping stroke to wipe said upper margin portion against said insole portion, said first and second spring means enabling the [ wiping means ] *wipers* during the wiping stroke to partake of said limited universal movement so as to conform precisely to the plane of said portion of the insole; and means effective only at the beginning of the wiping stroke to constrain the [ wiping means ] *wipers* against said limited universal movement provided by said first and second spring means, whereby said first and second spring means is operative on the [ wiping means ] *wipers* only after the [ wiping means has ] *wipers have* commenced to wipe said upper margin portion against said insole portion.

4. The apparatus as defined in claim 3 wherein the means for moving the [ wiping means ] *wipers* comprises: a drive means operatively connected to the [ wiping means ] *wipers* for effecting said movement of the [ wiping means ] *wipers*; wherein the apparatus further comprises: a cam, operatively connected to said drive means and said [ wiping means ] *wipers*, so constructed and arranged as to move from a retracted position to an advanced position during said wiping stroke in a plane corresponding to the plane of movement of the [ wiping means ] *wipers*; and wherein said means to constrain the [ wiping means ] *wipers* against said limited universal movement comprises: a first lug mounted to said primary arrangement and a second lug mounted to said support plate, said lugs being so constructed and arranged as to bear against the cam only at the beginning of the wiping stroke.

* * * * *

UNITED STATES PATENT AND TRADEMARK OFFICE

CERTIFICATE OF CORRECTION

PATENT NO. : Re. 28,824

DATED : May 25, 1976

INVENTOR(S) : Allen C. Harriman

It is certified that error appears in the above-identified patent and that said Letters Patent are hereby corrected as shown below:

Column 8, lines 51 and 55 and column 9, line 2, change "engagement" to --arrangement--.

Column 10, lines 13, before "rearwardly" insert --wipers--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*